June 16, 1936.  R. R. BROOKS ET AL  2,044,149
AUTOMATIC CONTROL SYSTEM
Filed Oct. 29, 1930  2 Sheets—Sheet 1

WITNESSES.
M. D. Fowler
R. G. Chilcott

INVENTORS.
Bascum O. Austin,
Norman H. Willby and
Ralph R. Brooks
BY
Wesley G. Carr
ATTORNEY June 16, 1936.    R. R. BROOKS ET AL    2,044,149
AUTOMATIC CONTROL SYSTEM
Filed Oct. 29, 1930    2 Sheets-Sheet 2

WITNESSES:
Leon J. Taza

INVENTORS
Bascum O. Austin,
Norman H. Willby, and
Ralph R. Brooks.
BY
ATTORNEY

Patented June 16, 1936

2,044,149

UNITED STATES PATENT OFFICE 2,044,149

AUTOMATIC CONTROL SYSTEM

Ralph R. Brooks and Norman H. Willby, Wilkinsburg, and Bascum O. Austin, Forest Hills, Pa., assignors to Westinghouse Electric and Manufacturing Company, a corporation of Pennsylvania Application October 29, 1930, Serial No. 491,956

7 Claims. (Cl. 172—179)

Our invention relates generally to motor-control systems and more particularly to systems for automatically controlling the acceleration of the propelling motors of electric vehicles.

The operating conditions for a modern vehicle are very different from those of a few years ago. A vehicle which travels over the streets of one of our cities now is required to operate under many variable conditions. In the most congested districts, all vehicles are operated as closely together as is physically possible, requiring the vehicles to stop frequently after short movements. Further, since modern systems of controlling traffic require vehicles to stop at many street intersections it is desirable that the vehicle be able to accelerate rapidly in order that a maximum number may pass an intersection in a given time. In the less congested areas, rapid acceleration, reasonable speed and quick-response control are necessary in order to secure maximum performance of the modern electric vehicle.

An object of our invention, generally stated, is to provide a control system which shall be simple, efficient and reliable in operation and which may be economically installed and maintained.

A more specific object of our invention is to provide for varying the rate of acceleration of electric motors which are controlled by an automatic accelerating system.

It is also an object of our invention to provide a control system which shall respond quickly to changes in the position of the master controller.

Other objects of the invention will be described fully hereinafter or will be apparent to those familiar with the art.

For a fuller understanding of the nature and scope of the invention, reference may be had to the following detailed description, taken in conjunction with the accompanying drawings, in which.

Figures 1, 2:
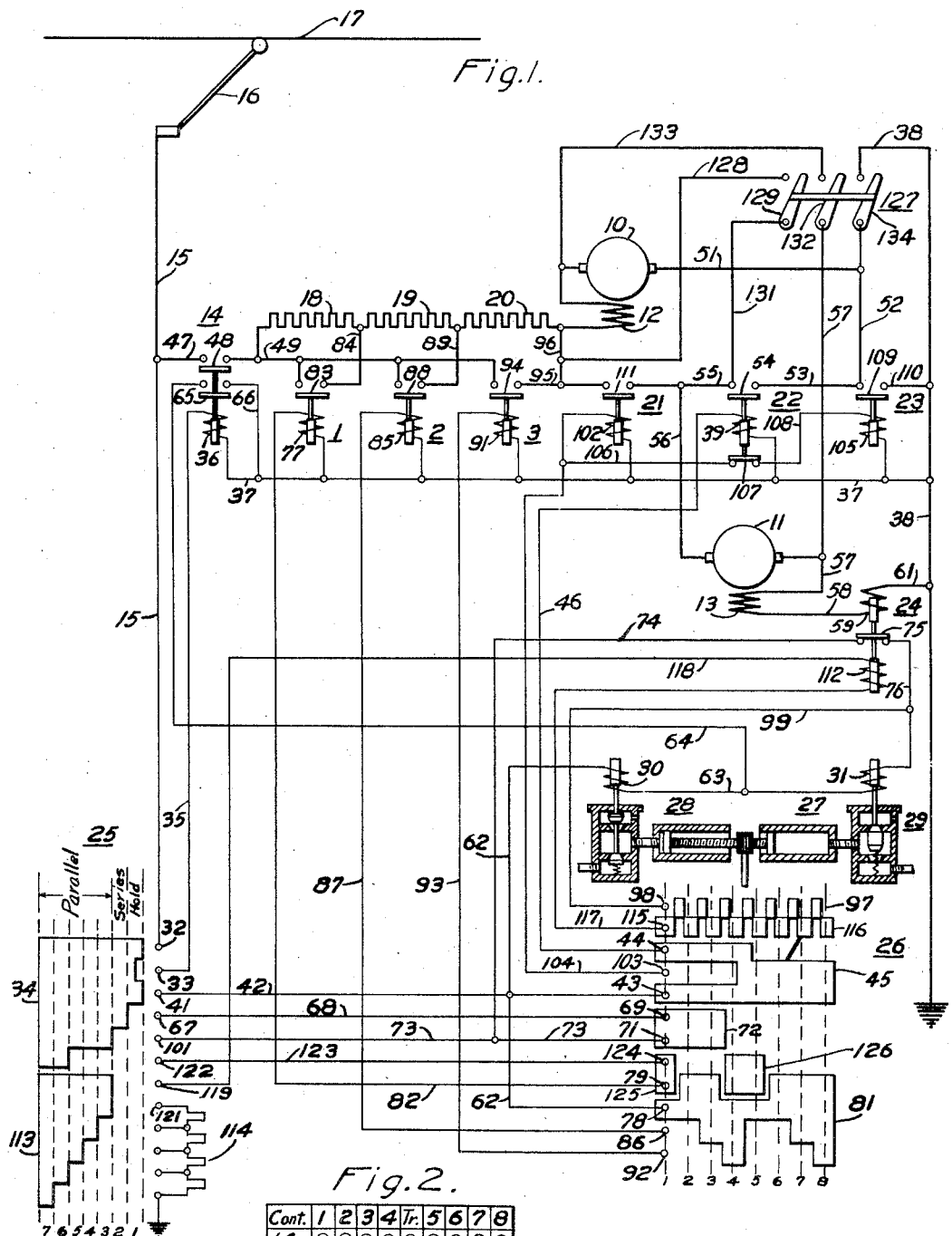
Figure 1 is a diagrammatic view showing the apparatus and the circuits of a motor-control system embodying our invention.
Fig. 2 is a chart showing the sequence of operation of a part of the apparatus shown in Fig. 1.
Figure 3:
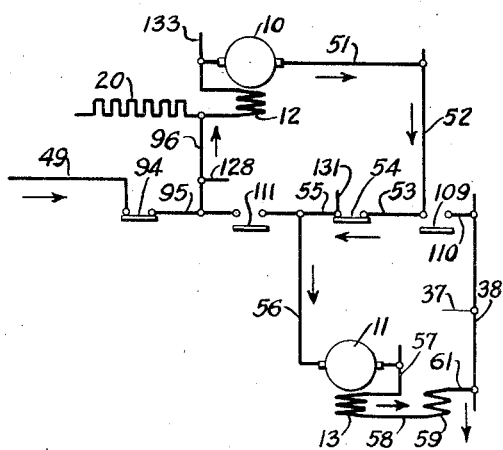
Fig. 3 is a diagrammatic view of the motor circuits, showing the motors connected in series-circuit relation.
Figure 4:
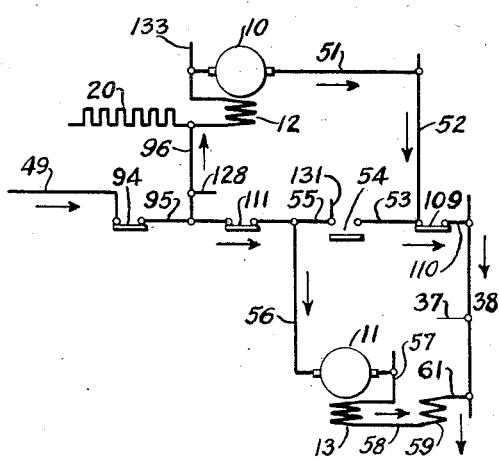
Fig. 4 is a diagrammatic view, showing the motors connected in parallel-circuit relation.

Referring to the drawings, 10 and 11 designate motors of a type suitable for propelling electric vehicles. The motors 10 and 11 are provided with series field windings 12 and 13, respectively. In accordance with standard practice, a line switch 14 is provided for connecting the motors to a power conductor 15 which is connected by means of a trolley 16, to a trolley-conductor 17.

As is the usual practice in railway control systems, a plurality of resistor sections 18, 19 and 20 are provided to control the current supplied to the motors 10 and 11, thereby controlling the acceleration of the motors. In order to simplify the drawing and description, only three resistor sections have been illustrated, but it will be readily understood that any desired number of resistor sections may be utilized in the control system. Accelerating switches 1, 2 and 3 are provided for shunting the resistor sections 18, 19 and 20, respectively.

In railway control systems, it is customary to connect the driving motors in series-circuit relation for starting the vehicle. After the car has accelerated to a predetermined speed, the motors are connected in parallel-circuit relation. A plurality of switches 21, 22 and 23 are provided for establishing the necessary circuits to connect the motors 10 and 11 in either series or parallel-circuit relation.

It is well known in the art that the acceleration of the motors 10 and 11 may be automatically controlled by a relay, commonly known as a current-limit relay, which is responsive to the current flowing in the motors. In this instance, a relay 24 is provided for automatically controlling the acceleration of the motors 10 and 11.

As is the usual practice, a master controller 25, which may be actuated by the operator of the vehicle, is provided for controlling the operation of the line switch 14 and a sequence switch 26. In this instance, a controller of the drum type, having a plurality of contact fingers disposed to engage contact segments, is provided.

In this instance, in order to automatically control the operation of the accelerating switches 1, 2 and 3, also the transfer switches 21, 22 and 23, we utilize the sequence switch 26 which is disposed to advance step-by-step upon the actuation of the master controller to set it in operation. As illustrated, the sequence switch comprises a plurality of contact fingers disposed to engage the contact segments mounted on a drum which is actuated by an air engine 27. The operation of the air engine 27 is controlled by magnet valves 28 and 29 which are actuated by coils 30 and 31, respectively. The air engine 27 is so constructed that the drum of the sequence switch 26 is advanced when both of the magnet coils 30 and 31 are energized. When both of the coils 30 and 31 are deenergized, the drum of the sequence switch is biased toward its "off" position. By energizing only one of the magnet valves, the drum of the switch 26 may be retained in any desired intermediate position.

The operation of a control system which permits the motors to accelerate at a normal rate will be described first and then a system embodying our invention, which provides for varying the rate of acceleration, will be described.

Assuming that it is desired to connect the motors 10 and 11 to the power source, the controller 25 is moved to the position which is commonly known as the "hold" position. A circuit is thereby established which actuates the line switch 14 to its closed position. This circuit extends from the power conductor 15, through contact fingers 32 and 33—bridged by contact segment 34—conductor 35, the actuating coil 36 of the line switch 14 and conductor 37, to a grounded conductor 38.

At the same time, the series switch 22 is actuated to the closed position, thereby connecting the motors 10 and 11 in series-circuit relation. The circuit for the actuating coil 39 of the series switch 22 may be traced from conductor 15, through contact fingers 32 and 41—bridged by contact segment 34—conductor 42, contact fingers 43 and 44—bridged by contact segment 45 of the sequence switch 26—conductor 46, the coil 39 and conductor 37, to the grounded conductor 38. The motors 10 and 11 are thereby connected in series-circuit relation and across the power source. The motor circuit may be traced from the power conductor 15, through conductor 47, contact members 48 of the line switch 14, conductor 49, the resistor sections 18, 19 and 20, the field winding 12 of the motor 10, the armature of the motor 10, conductors 51, 52 and 53, contact members 54 of the switch 22, conductors 55 and 56, the armature of the motor 11, conductor 57, the field winding 13, conductor 58, an actuating coil 59 of the limit relay 24 and conductor 61, to the grounded conductor 38.

The motors rotate at a relatively slow speed when all the resistors are connected in the circuit. If it is desired to accelerate to a higher speed, the master controller 25 may be actuated to the second position, thereby establishing actuating circuits for the sequence switch 26 which advances step-by-step until all the resistors are shunted, and the motors, connected in series-circuit relation, are directly across the power source.

As previously explained, the drum of the sequence switch 26 is advanced when the actuating coils 30 and 31 of the magnet valves 28 and 29 are both energized. The coil 30 is energized when the controller 25 is actuated to the first position. The circuit for the coil 30 may be traced from the energized conductor 42, through conductor 62, the coil 30, conductors 63 and 64, an interlock 65 on the line switch 14 and conductors 66 and 37, to the grounded conductor 38. The coil 31 is energized when the motor current is reduced to a value which permits the relay 24 to drop to its lowermost position. The circuit for the actuating coil 31 of the magnet valve 29 extends from conductor 15, through contact fingers 32 and 67—bridged by contact segment 34—conductor 68, contact fingers 69 and 71—bridged by contact segment 72—conductors 73 and 74, a contact member 75 of the relay 24, conductor 76 and the coil 31, to the grounded conductor 38 through a circuit previously traced for the coil 30 of the magnet valve 28.

When the drum of the sequence switch 26 is moved to the second position, a circuit is established for the actuating coil 77 of the accelerating switch 1, thereby actuating the switch 1 to the closed position to shunt the resistor section 18. The circuit for the coil 77 may be traced from the energized conductor 62 through contact fingers 78 and 79—bridged by a contact segment 81—conductor 82, the coil 77 and conductor 37, to the grounded conductor 38.

In this manner, the resistor section 18 is shunted by a contact member 83 of the accelerating switch 1. The motor circuit now extends from the power conductor 15, through conductor 47, contact members 48 of the line switch 14, conductor 49, contact members 83 of the accelerating switch 1, conductor 84, the resistor sections 19 and 20 and the motors 10 and 11 to ground through the circuit previously traced.

It will be understood that the current flowing through the motors will be increased when the resistor 18 is shunted by the accelerating switch 1. Therefore, the limit relay 24 is actuated to its uppermost position, if the motor current exceeds a predetermined value, thereby interrupting the circuit to the coil 31 of the magnet valve 29. As previously explained, the sequence switch 26 is retained in an intermediate position when the coil 31 is deenergized, the coil 30 being energized.

When the motors 10 and 11 have accelerated to a predetermined speed, the current through the motors will be reduced, by the counter electromotive force of the motors, to a value which permits the limit relay 24 to drop to its lowermost position. The energizing circuit for the coil 31 of the magnet valve 29 is, accordingly, reestablished, and the sequence switch 26 is moved to the third position.

When the sequence switch is moved to the third position, the accelerating switch 2 is closed to shunt the resistor section 19. The circuit for the actuating coil 85 of the switch 2 may be traced from the energized conductor 62, through contact fingers 78 and 86, bridged by the contact segment 81, conductor 87, the coil 85, and conductor 37, to the grounded conductor 38.

In this manner, the switch 2 is actuated to its closed position to shunt the resistor 19. The motor circuit now extends from the energized conductor 49, through a contact member 88 of the switch 2, conductor 89, resistor section 20 and the motors 10 and 11, through a circuit previously traced, to the grounded conductor 38. The limit relay 24 will again be raised by the increase in the motor current when the resistor section 19 is shunted, and the sequence drum 26 is retained in the third position until the motor current is reduced to a value which permits the limit relay to drop to its lowermost position.

When the circuit to the coil 31 of the magnet valve 29 is reestablished through the contact member 75 of the limit relay 24, the sequence switch is moved to the fourth position, and a circuit is established for the actuating coil 91 of the accelerating switch 3, thereby closing it. The circuit for the coil 91 may be traced from the energized conductor 62, through contact fingers 78 and 92 bridged by contact segment 81 conductor 93, the coil 91 and conductor 37, to the grounded conductor 38.

Accordingly, the resistor section 20 is shunted by contact member 94 of the switch 3, and the motor circuit extends from the energized conductor 49, through the contact member 94, conductors 95 and 96, the field winding 12 and the motors 10 and 11, to the grounded conductor 38 through a circuit previously described.

With a view to preventing the sequence switch 26 from stopping between positions when the circuit through the contact member 75 is interrupted by the actuation of the limit relay 24, a plurality of contact segments 97 are disposed to engage a contact finger 98 while the sequence drum is being actuated from one position to the next. An energizing circuit for the coil 31 is thereby established which extends from the energized conductor 42, through contact segments 45 and 97 of the sequence switch 26, the contact finger 98 and conductors 99 and 76, to the coil 31. In this manner, it is ensured that the sequence drum 26 will not stop between positions.

If it is desired to further accelerate the motors 10 and 11, the master controller may be actuated to position "3" to establish circuits for actuating the switches 21, 22 and 23 to connect the motors 10 and 11 in parallel-circuit relation.

When the master controller 25 is moved to position "3", the sequence switch 26 is actuated to the position "5", since the coil 31 of magnet valve 29 is now energized by a circuit which extends from the power conductor 15, through contact fingers 32 and 101—bridged by contact segment 34—conductors 73 and 74, contact member 75, conductor 76 and the coil 31, to the grounded conductor 38, through a circuit previously described.

When the sequence switch 26 is moved to position "5", the switch 21 is actuated to the closed position. The circuit for the actuating coil 102 of the switch 21 may be traced from the energized conductor 42, through contact fingers 43 and 103—bridged by contact segment 45—conductor 104, the coil 102 and conductor 37, to the grounded conductor 38.

At the same time, the circuit through the actuating coil 39 of the switch 22 is interrupted, since the contact segment 45 is disengaged from the contact finger 4, thereby permitting the switch 22 to drop to its lowermost position.

When the coil 39 of the switch 22 is deenergized, a circuit is established for the actuating coil 105 of the switch 23, thereby actuating the switch through its closed position. The circuit for the coil 105 may be traced from the energized conductor 104, through conductor 106, interlock 107 on the switch 22, conductor 108, the coil 105 and conductor 37, to the grounded conductor 38.

It will be observed that the circuits for the actuating coils of the accelerating switches 2 and 3 are also interrupted as the sequence switch 26 moves from the fourth to the fifth position, the circuit for the actuating coil of switch 1 having been interrupted when the sequence drum moved from the third to the fourth position.

Therefore, the motors 10 and 11 are now connected in parallel-circuit relation, and the circuit for the motor 10 extends from the power conductor 15, through conductor 47, contact members 48 of the line switch 14, conductor 49, the resistor sections 18, 19 and 20, the field winding 12, the armature of the motor 10, conductors 51 and 52, a contact member 109 of the switch 23, and conductor 110, to the grounded conductor 38.

The circuit for the motor 11 may be traced from the power conductor 15, through conductor 47, contact members 48 of the line switch 14, conductor 49, the resistor sections 18, 19 and 20, conductors 96 and 95, a contact member 111 of the switch 21, conductors 55 and 56, the armature of the motor 11, conductor 57, the field winding 13, conductor 58, the coil 59 of the limit relay 24 and conductor 61, to the grounded conductor 38.

The motors 10 and 11 may be permitted to accelerate at a normal rate, in a manner similar to that previously described, by allowing the resistor sections 18, 19 and 20 to be shunted by the accelerating switches 1, 2 and 3, respectively, in a predetermined sequence.

With a view to varying the rate of acceleration of the motors 10 and 11 when traffic conditions change and to obtaining a higher rate of acceleration, the limit relay 24, which controls the acceleration of the motors, is provided with a loading coil 112 which is disposed to oppose the actuating coil 59. When the coil 112 is energized, the amount of current required in the coil 59 to raise the relay 24 is increased, thereby increasing the amount of current permitted to flow through the motors 10 and 11 during each step of acceleration and, consequently, increasing the rate of acceleration of the motors.

It will be observed that the master controller 25 is provided with a contact segment 113 which is disposed to engage a plurality of contact fingers, which are connected to a resistor 114. When the master controller is moved to the third position to connect the motors in parallel-circuit relation as previously described, an energizing circuit for the loading coil 112 of the limit relay 24 is established. This circuit may be traced from the energized conductor 42, through contact fingers 43 and 115—bridged by the contact segments 45 and 116—conductor 117, the coil 112, conductor 118, contact fingers 119 and 121—bridged by the contact segment 113 of the master controller 25—and the resistor 114, to ground. In this manner, the coil 112 is energized, and the current required to retain the limit relay 24 in its uppermost position is increased, therefore, the time interval between the steps of acceleration is reduced and a higher rate of acceleration of the motors is obtained.

In order to provide a control system which will respond quickly to changes in the amount of current flowing in the motor circuit and thereby permit a fast rate of acceleration, the drum of the sequence switch 26 is provided with a plurality of contact segments 116 which are so disposed that they alternately establish and interrupt the circuit through the loading coil 112 of the relay 24. It will be observed that the contact segments 116 are so spaced on the drum of the sequence switch, with reference to the contact segment 81, that the circuit through the coil 112 is interrupted when the circuits for the actuating coils of the accelerating switches 1, 2 and 3 are respectively established. Therefore, the coil 112 is deenergized when each of the resistor sections 18, 19 and 20 is initially shunted, which ensures that the limit relay 24 will be raised to its uppermost position to interrupt the circuit through the coil 31 of the magnet valve 29.

However, it will be seen that the contact finger 115 is engaged by one of the segments 116, which energizes the loading coil 112, during the interval that the sequence drum 26 is traveling from one position to the next, which ensures that the relay 24 will be biased to its lowermost position, thereby permitting the sequence drum to continue to travel. Accordingly, an additional step of the accelerating resistor is shunted, unless the current flowing in the motors exceeds a predetermined value.

The amount of current permitted to flow in the motors may be governed by the position of the master controller 25. It will be observed that, as the controller drum is advanced from left to right, the resistor 114 is shunted, step-by-step, by the contact segment 113, thereby increasing the current permitted to flow through the coil 112. Since an increase in the current flowing in the coil 112 increases the downward pull on the armature of the relay 24, the amount of current required in the coil 59 of the relay 24 to raise the armature of the relay is increased. Consequently, the current permitted to flow through the motors 10 and 11 before the limit relay 24 is actuated to its uppermost position is increased. Therefore, the rate of acceleration of the motors may be controlled by the position of the master controller 25. If it is desired to accelerate at a high rate this may be accomplished by actuating the controller 25 to the last position, which shunts the last step of the resistor 114.

If it is desired to accelerate rapidly from standstill, the controller 25 may be actuated to position "6", thereby establishing a circuit for the actuating coil of the accelerating switch 1. This circuit may be traced from the power conductor 15, through contact fingers 32 and 122—bridged by contact segments 34—conductor 123, contact fingers 124 and 79—bridged by contact segment 125—conductor 82, the coil 77 and conductor 37, to the grounded conductor 38. In this manner, the resistor section 18 may be shunted immediately, thereby increasing the current supplied to the motors 10 and 11 and avoiding the delay resulting from the time required for the drum of the sequence switch 26 to be actuated to the second position, which normally establishes the energizing circuit for the actuating coil of the accelerating switch 1.

It will be observed that a contact segment 126 is provided on the drum of the sequence switch 26 and is disposed to bridge the contact fingers 124 and 79 while the sequence drum is rotating from the fourth to the fifth position. If the master controller 25 has been actuated to the sixth position, to rapidly accelerate the motors, the circuit for the actuating coil 77 of the accelerating switch 1 will be reestablished through the contact segment 126 while the drum of the sequence switch is moving from the fourth to the fifth position, which is commonly known as the "transition" period. During this time the switches 21, 22 and 23 are being actuated to change the motor connections from series to parallel relation, as previously described. In this manner, the resistor section 18 may be shunted, and the current which is supplied to the motors, when they are connected in parallel circuit relation, is increased. It will be understood that the circuits through the contact segments 125 and 126 are established only when the master controller 25 is on the sixth and seventh positions, which are utilized when the highest rate of acceleration is desired. When the master controller 25 is set on the intermediate positions, which provide a lower accelerating rate, the circuits through the contact segments 125 and 126 are not established, and the circuits for the actuating coils of the accelerating switches 1, 2 and 3 are established through the contact segment 81 of the sequence switch 26 in the normal sequence previously described.

If, at any time during the accelerating period, it is desired to stop accelerating the vehicle, the master controller 25 may be actuated to the "hold" position, thereby deenergizing conductors 68, 73 and 74, which, in turn, deenergizes the actuating coil 31 of the magnet valve 29. As previously explained, the piston of the air engine 27 may be retained in any position by deenergizing the actuating coil 31 of the magnet valve 29, the actuating coil 30 of the magnet valve 28 being energized. In this manner, the drum of the sequence switch 26 may be retained in any intermediate position, thereby interrupting the sequence of operation of the accelerating switches.

It is desirable in any electrically propelled vehicle to provide a means of electrically braking the vehicle in case of emergency. In order that an electric motor may be used for retarding the motion of the vehicle it is necessary to reverse the direction of the flow of current through either the field or the armature of the motor. It is desirable to reverse the current in the armature and not the field in order that the residual magnetism in the magnetic circuit in the field may be utilized to assist in building up the voltage generated by the motors when they are utilized for braking purposes.

Figure 5:
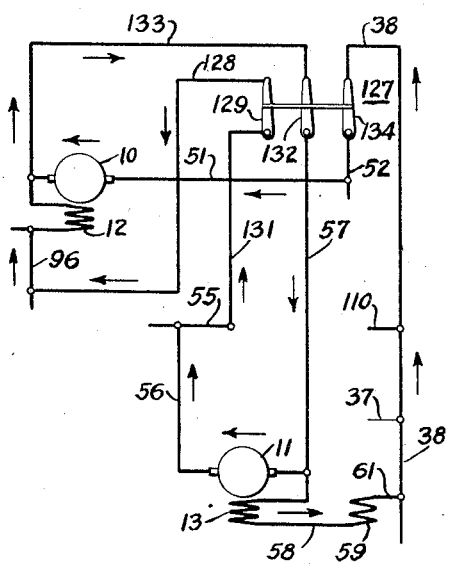
Fig. 5 is a diagrammatic view, showing the motors connected for electrical braking.
Figure 6:
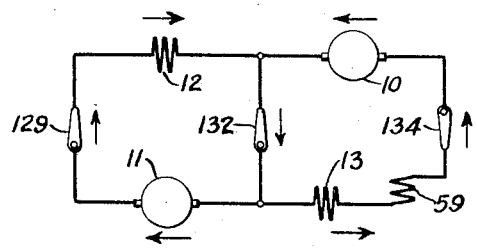
Fig. 6 is a simplified diagrammatic view of the circuits shown in Fig. 5.

By moving the master controller 25 to the "off" position, which permits the line switch 14 to open, thereby disconnecting the motors 10 and 11 from the power source and then closing a switch 127, circuits are established which connect the armature of the motor 10 in series with the field winding 13 of the motor 11 and also the armature of the motor 11 in series with the field winding 12 of the motor 10, as shown in Figs. 5 and 6. These circuits may be traced from one side of the field winding 12, through conductors 96 and 128, contact member 129 of the switch 127, conductors 131, 55, 56, the armature of the motor 11, conductor 57 the contact member 132 of the switch 127 and conductor 133, to the other side of the field winding 12. The circuit through the field winding 13 may be traced from one side of the field winding 13, through conductor 57, contact member 132 of the switch 127, conductor 133, the armature of the motor 10, conductors 51 and 52, contact member 134, of the switch 127, conductors 38 and 61, the coil 59 of limit relay 24 and conductor 58, to the other side of the field winding 13. The direction of flow of current through the armature and the field windings of the motors during the braking operation is indicated by the arrows in Figs. 5 and 6.

By thus cross-connecting the motors 10 and 11, the counter-electro-motive force of one motor impresses a voltage across the field of the other motor which is in the same direction as the voltage applied to the field winding during normal operation of the motors. Therefore, the voltage generated by the motors, which are acting as generators during the braking operation, is permitted to build up rapidly, resulting in a high braking effort.

In order to simplify the drawings, the switch 127, which establishes the connections for emergency braking, is illustrated as being independent of the controller 25. It will be readily understood that the switch 127 may be either mechanically or electrically interlocked with the controller to prevent the closing of the switch until the controller has been actuated to a predetermined position. Also, if desired, contact members may be provided on the controller to establish the connections for emergency braking when the controller is actuated to a predetermined position.

It will be evident from the foregoing description that we have disclosed a control system, which may be utilized for controlling electric motors of various types and which is especially suitable for controlling the propelling motors of electric vehicles, that is an improvement on control systems previously known. We have provided an automatic control system which permits the rate of acceleration of a vehicle to be varied in accordance with the operating conditions, and which responds quickly to changes in the position of the master controller, thereby permitting the vehicle to be operated at higher speeds without sacrificing safety.

We do not desire to be restricted to the specific embodiment or arrangement of parts herein shown and described since it is evident that they may be changed and modified without departing from the spirt and scope of our invention as defined in the appended claims.

We claim as our invention:

1. In a motor-control system, in combination, a motor, a source of power for the motor, a plurality of resistor sections to control the current supplied the motor, a plurality of accelerating switches for shunting the resistor sections to accelerate the motor step-by-step, a sequence switch for controlling the operation of the accelerating switches, a relay responsive to the current flowing in the motor for controlling the actuation of the sequence switch, and means associated with the sequence switch and cooperating with said relay to vary the current required to actuate said relay between each step of acceleration of the motor.

2. In a motor-control system, in combination, a motor, a source of power for the motor, a plurality of resistor sections for controlling the current supplied the motor, a plurality of accelerating switches for shunting the resistor sections to accelerate the motor, a sequence switch for controlling the operation of the accelerating switches, a relay responsive to the current flowing in the motor for controlling the actuation of the sequence switch, said relay having an actuating coil and a loading coil disposed to oppose the actuating coil, and means associated with the sequence switch for alternately energizing and deenergizing the loading coil of the relay at predetermined intervals to cause the relay to respond quickly to changes in the motor current.

3. In a motor-control system, in combination, a motor, a source of power for the motor, a plurality of resistor sections for controlling the current supplied the motor, a plurality of accelerating switches for shunting the resistor sections to accelerate the motor, a sequence switch for controlling the operation of the accelerating switches, a relay responsive to the current flowing in the motor for controlling the actuation of the sequence switch, said relay having an actuating coil and a loading coil disposed to oppose the actuating coil, and a plurality of contact segments so disposed on the sequence switch that the loading coil is alternately energized and deenergized, whereby the loading coil is deenergized during the shunting of a resistor section.

4. In a motor-control system, in combination, a motor, a source of power for the motor, a plurality of resistor sections to control the current supplied the motor, a plurality of accelerating switches for shunting the resistor sections, a sequence switch for controlling the operation of the accelerating switches, an air engine for actuating the sequence switch, a limit relay responsive to the current flowing in the motor for controlling the operation of the air engine, said relay having an actuating coil and a loading coil disposed to oppose the actuating coil, and means associated with the sequence switch for alternately energizing and deenergizing the loading coil of the relay at predetermined intervals to increase the speed of response of the relay, whereby the sequence switch may be actuated rapidly.

5. In a motor-control system, in combination, a motor, a source of power for the motor, a plurality of resistor sections to control the current supplied the motor, a plurality of accelerating switches for shunting the resistor sections to accelerate the motor, a sequence switch for normally controlling the operation of the accelerating switches in a predetermined sequence, means for actuating the sequence switch, a controller for controlling the position of the sequence switch, and means associated with the sequence switch and cooperating with the controller to cause the operation of certain of the accelerating switches immediately upon the actuation of the controller to a predetermined position.

6. In a motor-control system, in combination, a motor, a source of power for the motor, a plurality of resistor sections to control the current supplied the motor, a plurality of accelerating switches for shunting the resistor sections to accelerate the motor, a sequence switch for normally controlling the operation of the accelerating switches, means for actuating the sequence switch step-by-step to operate the accelerating switches in a predetermined sequence, a controller for controlling the position of the sequence switch, and means associated with the sequence switch and cooperating with the controller to operate certain of the accelerating switches immediately upon the actuation of the controller to a predetermined position, whereby the current supplied the motor may be increased before the sequence switch starts to operate.

7. In a motor-control system, in combination, a motor, a source of power for the motor, a plurality of resistor sections to control the current supplied the motor, a plurality of accelerating switches for shunting the resistor sections to accelerate the motor, a sequence switch for normally controlling the operation of the accelerating switches, means for actuating the sequence switch step-by-step to operate the accelerating switches in a predetermined sequence, a controller for controlling the position of the sequence switch, and contact members on the sequence switch disposed to cooperate with the controller to effect the operation of certain of the accelerating switches before the sequence switch is actuated to the position to normally operate said accelerating switches when the controller is actuated to a predetermined position.

RALPH R. BROOKS.
NORMAN H. WILLBY.
BASCUM O. AUSTIN.